United States Patent
Asonov

(10) Patent No.: US 8,250,072 B2
(45) Date of Patent: Aug. 21, 2012

(54) DETECTING REAL WORD TYPOS

(75) Inventor: Dmitri Asonov, Moscow (RU)

(73) Assignee: Dmitri Asonov, Moscow (RU)

( * ) Notice: Subject to any disclaimer, the term of this patent is extended or adjusted under 35 U.S.C. 154(b) by 232 days.

(21) Appl. No.: 12/717,913

(22) Filed: Mar. 4, 2010

(65) Prior Publication Data

US 2010/0228729 A1  Sep. 9, 2010

Related U.S. Application Data

(60) Provisional application No. 61/158,198, filed on Mar. 6, 2009.

(51) Int. Cl.
*G06F 7/00*     (2006.01)
*G06F 17/30*    (2006.01)
*G06F 17/27*    (2006.01)
*G06F 15/16*    (2006.01)

(52) U.S. Cl. ........................... 707/730; 715/257

(58) Field of Classification Search .......... 707/730; 715/257
See application file for complete search history.

(56) References Cited

U.S. PATENT DOCUMENTS

| | | | |
|---|---|---|---|
| 6,618,697 B1* | 9/2003 | Kantrowitz et al. | 703/22 |
| 7,574,348 B2 | 8/2009 | Hon et al. | |
| 7,774,193 B2 | 8/2010 | Gao et al. | |
| 7,809,695 B2* | 10/2010 | Conrad et al. | 707/730 |
| 2006/0242191 A1* | 10/2006 | Kutsumi et al. | 707/102 |
| 2010/0030553 A1* | 2/2010 | Ball | 704/9 |

OTHER PUBLICATIONS

Bolshakova et al., Experiments in Detection and Correction of Russian Malapropisms by Means of the Web, International Journal: Information Theories and Applications, 2005, vol. 12.

Bolshakov et al., Various Criteria of Collocation Cohesion in Internet: Comparison of Resolving Power, CICLing 2008, Proceedings of the 9th International Conference on Computational Linguistics and Intelligent Text Processing, 2008, Haifa, Israel.

* cited by examiner

*Primary Examiner* — Greta Robinson
*Assistant Examiner* — Brian E. Weinrich
(74) *Attorney, Agent, or Firm* — Carr & Ferrell LLP

(57) ABSTRACT

Systems and methods for detecting real word typos are provided. Received text is designated for evaluation. A plurality of words in the received text is parsed into word pairs. A word pair is two consecutive words found in the designated text. A database is identified for comparison to the text. The database includes word pairs previously identified in one or more source texts. The word pairs in the received text are analyzed based on a comparison to the word pairs in the identified database. Based on the analysis, an indication may be generated that a word pair from the designated text may include an error.

12 Claims, 3 Drawing Sheets

160 (FIG. 1)

| typo and correct version |
|---|
| Elsewhere, *Russia they* exchanged; Russia exchanged already hedged *it consumption*; its consumption in *order satisfy* chipmaker; to satisfy I know *if no* instance; of no said *he that* he; said that he some will *the see*; some will see she *quickly she* won; she quickly won for the quarter *last this* month; last quarter this month looking *for get* a child online; for a child online *Its a*; It's a |

FIGURE 3

DETECTING REAL WORD TYPOS

CROSS-REFERENCE TO RELATED APPLICATIONS

The present application claims the priority benefit of U.S. provisional patent application No. 61/158,198 filed on Mar. 6, 2009, the disclosure of which is incorporated herein by reference.

BACKGROUND OF THE INVENTION

1. Field of the Invention

The present invention generally relates to proofreading. More specifically, the present invention relates to detecting real word typos.

2. Background of the Related Art

Finding and fixing contextually incorrect and contextually inappropriate words is an important task in publishing, optical character recognition (OCR), end user word processing, translation, speech recognition and other industries. Contextually incorrect and contextually inappropriate words are referred to as real-word typos or typos for short. The use of word processing software allows for such errors in typing and data entry to arise. Such errors may be exacerbated when word processing takes place in conjunction with speech recognition, optical character recognition (OCR), translation software, etc.

Typos can still be found in newspapers, magazines, and books that are published nowadays. Emails, Wikipedia articles, and other electronic documents produced by end user word processing systems often contain typos, sometimes regrettable and embarrassing ones (e.g., "Thank you for your massage" instead of "Thank you for your message"). Documents produced by OCR may be prone to typos. Manually and automatically translated documents are prone to typos as well. The Internet is also full of typo collections from printed and electronic media.

Apart from introducing potential embarrassment, loss of reputation, and introducing inaccuracy and difficulty for readers, typos may result in monetary expenses for publishing, translation, and OCR service providers. These expenses may include hiring human proofreaders, editors, and/or style correctors. Expenses may further include issuing/publishing errata and apology/explanation letters. Typos also inflict additional timing constraints in time-critical services, such as newspapers where time must be allotted for proofreading articles already written on short deadlines. While online articles may be edited after publication, such articles (and its typos) may have already been copied and propagated by other news channels and blogs, which makes it extremely difficult, if not impossible, to correct all iterations of the typos.

For human, proofreading is a time-consuming task because the entire document or book has to be read even if few typos are present. In addition to being time-consuming, proofreading can sometimes also be very hard for the human eye and brain. Certain "stealth" typos may be especially hard to detect and therefore frequently escape notice.

In addition to human editors/proofreaders, computerized spell-checkers and grammar-checkers may also be used. Computerized spell-checkers and grammar-checkers are generally dependent on dictionaries or rules stored in a database. Such checkers, however, may fail to detect errors in word choice or usage. For example, a word may be spelled correctly according to some dictionary entry and used properly with respect to the rules of grammar, yet still represent an error. As such, spell- and grammar-checkers are unable to detect such an error. While human editors may be able to correct errors, they are generally unable to search for errors as quickly or as comprehensively as computerized checkers.

One presently available method for detecting such real word typos is context-sensitive spelling correction (CSSC), which focuses on computer-fixable errors and relies on stored "confusion sets" of words. "Confusion sets" include sets of words that have been previously identified by a human editor as being a common typo. For example, "there," "their," and "they're" may be included in a confusion set. Such terms may be inadvertently or deliberately interchanged by a typist or a speech recognition program. CSSC identifies the words in the confusion sets that are present in a text. CSSC then determines, based on context, whether or not the correct word in the confusion set is used in the text. When a phrase belonging to a confusion set is found in the text, the phrase is suspected of being a typo. Phrases from the related confusion set may be automatically sorted by likelihood of being a typo in the specific context of the confusion set. The phrase from the confusion set that has the lowest likelihood of being a typo is selected. If the selected phrase is not the one that is currently being parsed, a typo is declared to be found in the parsed phrase. The typo is automatically corrected by replacing the parsed phrase with the selected phrase.

CSSC therefore has limitations as a model. Firstly, it focuses on typo correction in addition to typo finding. As a result, CSSC solutions inherently focus on and are designed for finding only those typos that can be corrected by computer. This in turn narrows the number of typo types to be found. Secondly, CSSC implies and relies upon the concept of confusion sets, which further limits the number of typo types that can found.

There is therefore a need for improved systems and methods for detecting real word typos that do not rely on a set of confusion lists and find not only limited set of confusion typos but almost any type of typos.

SUMMARY OF THE INVENTION

Embodiments of the present invention provide systems and methods for detecting real word typos. Received text is designated for evaluation. A plurality of words in the received text is parsed into word pairs. A word pair is two consecutive words found in the designated text. A database is identified for comparison to the text. The database includes word pairs previously identified in one or more source texts. The word pairs in the received text are analyzed based on a comparison to the word pairs in the identified database. Based on the analysis, an indication may be generated that a word pair from the designated text may include an error.

Methods for detecting real word typos may include receiving text including multiple words designated for evaluation, parsing the plurality of words into a plurality of consecutive word pairs found in the designated text, identifying a database of previously identified word pairs for comparison to the text, analyzing the word pairs parsed from the designated text based on a comparison to the word pairs in the identified database, and generating an indication that a word pair from the designated text may include an error based on the analysis.

In some embodiments, methods may further include receiving a designated source text comprising a plurality of words, identifying a language of the designated source text, parsing the plurality of words into a plurality of consecutive word pairs found in the source text, and storing the parsed plurality of word pairs in a database associated with the identified language of the source text.

Systems for detecting real word typos may include a memory configured to store a database comprising a plurality of consecutive words parsed from a source text, an interface configured to receive a text including multiple words designated for evaluation, and a processor configured to parse the plurality of words into a plurality of consecutive word pairs found in the designated text, identify a database of previously identified consecutive word pairs for comparison to the designated text, and analyze the word pairs parsed from the designated text based on a comparison to the word pairs in the identified database. Such systems may further include a display generation engine configured to generate an indication that a word pair from the designated text may include an error based on the analysis of the word pair in comparison to the identified database.

Embodiments of the present invention may further provide for computer-readable storage media. Embodied on such computer-readable storage media may be a program that is executable by a processor to perform a method for detecting real word typos.

BRIEF DESCRIPTION OF THE DRAWINGS

FIG. 3 is a list of exemplary typos that may be identified in connection with the typo identification step 160 of FIG. 1, further illustrating what typos are. The correct version of the typo is also shown.

DETAILED DESCRIPTION

Embodiments of the present invention allow for detection of real word types. Such errors may be found by parsing the examined text into word pairs and analyzing the word pairs based on a collocation database of pairs of consecutive words. Such a database may be built based on one or more sample texts in a certain language. For example, novels, treatises, news articles, and papers may provide various samples of how words are generally used in a particular language. Such a sample text is parsed to provide pairs of consecutive words. A database may be based on one or more texts, each of which may be parsed to provide consecutive word pairs for the database. In some embodiments, sample texts may be parsed into word triplets or quadruplets of consecutive words, but for simplicity, the examples herein may refer to word pairs.

Such detection allows for a flexible trade-of between the time a human is willing to spend on the task and the quality of the proofreading. Such detection further does not require tagging for training, and may be applied seamlessly and efficiently to raw text of different languages.

Context sensitive spelling correction is the task of detecting and fixing spelling errors that result in valid words such as "I'd like a peace of cake" where "peace" was typed when "piece" was intended. Such typos therefore result in real, valid words that are not correctly or appropriately used in the particular context. Once typos are found, the elimination of typos may be left to human or further computerized analysis. Finding the typos may take a large part of time spent proofreading. Thus, making the "finding" part more efficient can yield better proofreading, time- and quality-wise.

Proofreading quality may be evaluated in terms of false positive rate (FP) on checked text and hit rate (HR), which directly reflect the time savings compared to a human proofreader and the percentage of typos detected.

The task to catch any real-word typo is a difficult one. The algorithms for automated correction of typos may generally assume a relatively narrow type of typos for which to offer a legitimate automated correction. Dropping the correction requirement, however, opens up a lot of new opportunities to explore. Detection may therefore be free of the assumptions and restrictions inherent in the goal of automating corrections. While the success of a detection-only method may be similar to automated correction methods with respect to the specific types of typos, a detection-only method may outperform automated correction methods in detecting a greater variety of typos.

Figure 1:
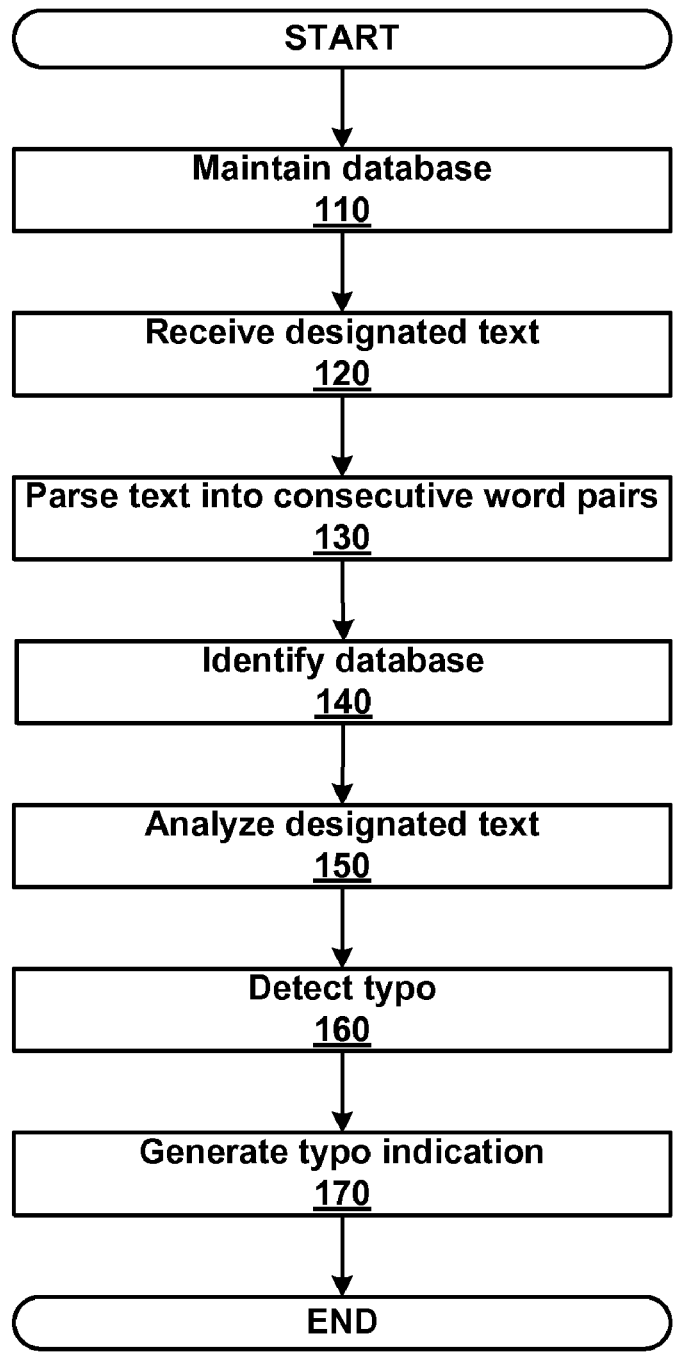
FIG. 1 is a flowchart illustrating an exemplary method for detecting real word typos.

FIG. 1 is a flowchart illustrating an exemplary method for detecting real word typos. In the illustrated method, a database of source texts is maintained, text designated for evaluation is received, the designated text is parsed into word groups, the database is identified, the designated text is analyzed, a typo is detected, and a typo indication is generated.

In step 110, a database is built and/or maintained. A database may be built based on a large body of training texts. Such texts may include articles, newspapers, magazines, journals, books, other types of documents, etc., that provides samples of how words in a certain language are used. As such, such texts are not mere lists of words, but demonstrate use of the words in context. Such texts may be parsed into groups of consecutive (or collocated) words. For example, a text may be parsed in pairs of consecutive words. "I want a piece of cake" may therefore be passed into the following pairs: "I want," "want a," "a piece," "piece of," and "of cake." The groups may range from pairs to triplets, quadruplets, as well as even larger groups. As demonstrated, a word may appear in two different pairs (e.g, "I want" and "want a"), and the words in the word pair appear in the sample text as consecutive words. Further, a word group such as "want cake" is not a word group that can be parsed from "I want a piece of cake", because "want" and "cake" do not appear consecutively in that sentence. Further, a word pair such as "cake of" is not a consecutive word group, since "cake" does not appear before "of" in the designated text.

Conclusions may be drawn about the probability that a specific collocation of words contains a real-word typo. Collocations in the input text can, further, be sorted in the order of this probability decreasing. Given the time allowed for proofreading the input text, the proofreader may be provided with the top-k pairs (and corresponding sentences, if needed) to check and correct if necessary. Alternatively, the threshold may be adjusted and the top-k may be generated based on the threshold, in addition to or instead of the time available to the proofreader. For example, the threshold may be fixed to approximately provide for specific/desired proofreading quality (specific hit rate).

Raw, untagged bodies of text may be used in construction of the collocation databases having diverse sources and different languages. In some cases, building collocations without discrimination for parts of speech (POS) may improve the quality of the algorithm, which can determine the approximate probability that a group (e.g., pair) of words $<w_1\ w_2>$ contains a real word typo.

The collocation database may be created as a flat file matrix $M_{N \times N}$, where N is the size of the dictionary generated from the training text(s). Each cell $<i,j>$ in the matrix may store a single integer value—the number of collocations of a pair $w_i$ $w_j$ in the training text. The matrix structure enables easy, on-the-fly address resolution for any i,j. The position of the required collocation value in the file may be calculated as (N*i+j)* size of(int). The hard disc space required, however, may be million times the size of the dictionary. For example, a training text (of 600 million words) may include 4.5 million distinct words once repetitions are eliminated. This may imply 20 terabytes of disc space required for storing the collocation database assuming four byte integer size.

A structured query language (SQL) database approach can reduce the disc space requirements since storing the zero value tuples corresponding to zero collocations is not necessary. Even one SQL query per word, however, may result in an unacceptably slow processing speed for many applications. The simplicity and low overhead of the flat file approach and flexible indexing of a database may be combined, in which zero collocation values are not stored to save on disc space, and an index data structure may be provided to point to a sorted list of all collocations of a specific word within a flat file. Further, finding specific collocation value in a sorted list may be logarithmic in the number of distinct collocations of a given word. Employing the collected knowledge about the distribution pattern of the collocations for each word and using memory file mapping further decreases the number and duration of disc accesses.

The texts for building a collocation database can be collected from various sources, including automatic collection from the Internet. An exemplary English training text may include 461 million words, 2.31 million of which may be distinct. The collocation database based on such texts may include 387 million word pairs, resulting in 29.8 million distinct word pairs.

In step 120, text designated for evaluation is received. Once the collocation database is built, other texts in the language may be evaluated. For example, an editor may want to evaluate a set of newspaper articles to determine the presence of real word typos. The text designated for evaluation may be uploaded, emailed, or otherwise provided.

In step 130, the text is parsed into consecutive word groups. Using the newspaper article example, the text in the articles may be parsed into word pairs. Each word pair includes two words that are ordered consecutively in the designated text.

In step 140, a database is identified. Many databases may exist and may vary in terms of language, genre, subject matter, etc. An exemplary database used to evaluate the newspaper articles may be an English database built using previous newspaper articles. In some embodiments, the user may designate the language. Alternatively, the language may be identified based on an analysis of the designated text.

In step 150, the text is analyzed. The analysis may include a comparison of the word pairs derived from the designated text with word pairs stored in the database. For each word pair, a typo likelihood may be determined. To determine a typo likelihood, various algorithms, formulas, etc., may be used. Factors that may be taken into account include the number of times the word pair appears in the source texts, the number of times each word in the word pairs appears in the source text(s), etc. An exemplary algorithm be determined as follows:

TL=typo likelihood
C1=a number of times a first word appears in the source text
C2=a number of times a second word appears in the source text
C12=a number of times a word pair comprising the first word followed by the second word appears in the source text
TL=(C1*C2)/C12

Such an algorithm may be further fine-tuned to account for rare or specialized words, proper names, etc.

Figure 2:
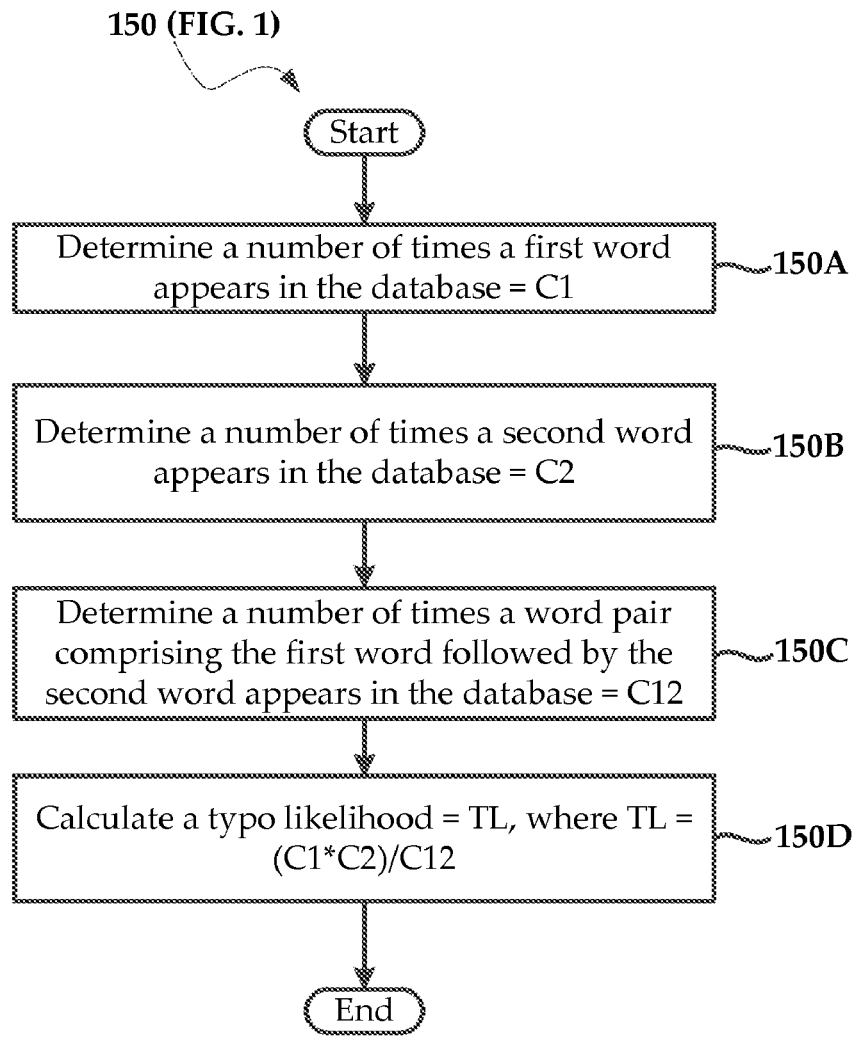
FIG. 2 is a flowchart illustrating an exemplary method for performing the analysis step 150 of FIG. 1, further illustrating how databases are used to detect typos, and the calculation of likelihood values for parsed word groups.

FIG. 2 is a flowchart illustrating an exemplary method for performing the analysis step 150 of FIG. 1, further illustrating how databases are used to detect typos, and the calculation of likelihood values for parsed word groups.

At step 150A, a number of times a first word appears in the database is determined. This number is designated C1 in the typo likelihood calculation formula.

At step 150B, a number of times a second word appears in the database is determined. This number is designated C2 in the typo likelihood calculation formula.

At step 150C, a number of times a word pair comprising the first word followed by the second word appears in the database is determined. This number is designated C12 in the typo likelihood calculation formula.

At step 150D, a typo likelihood is calculated. This number is designated TL in the typo likelihood calculation formula: TL=(C1*C2)/C12.

In step 160, a typo may be identified. The greater the value of TL for a particular word pair, the higher the likelihood that at least one of the words in the word pair is a typo. Roughly, if the words are used frequently but rarely appear consecutively, the likelihood is that the consecutive word pair contains a real word typo. Special consideration may be required where the number of collocations C12 is zero and TL becomes invalid as a result. One option is to assign C12 a number between 0 and 1. Another option is to presume C12 is 1 and to handle such pairs separately. For example, such pairs may be put aside and sorted. The top-k collocations may be marked as "detected" in addition to the top-k collocations where C12>0.

While word pairs consisting of only very infrequently-used words may not register as errors, the probability of two words of very low frequency collocating is lower than other outcomes (e.g., only one of the words infrequently-used or both words being relatively frequent). Further, this issue diminishes as the collocation database grows. Further, consecutive word groups of greater sizes may be used to detect the rare irregularities that may not be evident in groups of two consecutive words. Punctuation signs may or may not be considered in building the database.

FIG. 3 is a list of exemplary typos that may be identified in connection with the typo identification step 160 of FIG. 1, further illustrating what typos are. The correct version of the typo is also shown.

In step 170, a typo indication may be generated. Indications may occur as a result of determining typo likelihood to alert the user or human editor to a possible or likely typo. If a word pair from an examined text does not appear in the database, an indication may still be generated that the word pair is a possible typo. The word pair is not corrected in the examined text, but may merely be highlighted, underlined, flagged, etc. Alternatively, the indication may be a list or summary of the possible typos, including links to the designated text. The indication may further include suggestions for correction based on probabilities calculated using the database. Such suggestions may be displayed, for example, in the order of appearance in the examined text, or in the order of decreasing typo likelihood. In further embodiments, the designated text and the typo indication(s) may be provided to a separate application for further analysis and/or correction. As such, the detected typos can be fixed by a human or computer proofreader or a combination of the same. In some instances, the human user/editor may indicate that the word pair is acceptable, or the user/editor may change one or both of the words in the word pair, or may choose to rephrase the entire sentence. The database may be updated to store information concerning such input.

Alternatively, the method may also mark as suspicious a word pair that appears in a database as a known, common, or possible typo. Such a method may also be used in conjunction with one in which an alarm is not raised for a word pair that does not appear in the database. Such features have certain advantages and take into account the possibility that a database built from various texts may contain word pairs that are real-word typos. Further, the fact that a word pair is not in the database does not necessarily mean that the word pair constitutes a real-word typo.

The proposed method may bring the state of the art false positive rates on checked text down from 19-25% to 2-6%, while keeping the coverage and hit rate in the eighties-nineties of percents. Sub-percent false rates are demonstrated by trading in the decrease of the hit rate down to 50-60%. However, the method can tackle almost unlimited types of typos.

The typo likelihood definition may treat "unusual" cases equally, whether the collocation count is large or tiny. For two cases that are equally "unusual" statistically, cases with a tiny collocation count may be more problematic than cases with a large count. To address such cases, the power of C12 may be adjusted so that the larger the collocation count, the smaller TL becomes. The power values may be between 1 and 2. A power may be selected based on aspects of the particular text. Further, the word counts in the equation may be fine tuned for special purposes as well. Further rational alterations and optimizations are possible.

Two consecutive word groups (that share a word) may both exhibit high TLs when the shared word is a real-word typo. As such, such cases may be assigned a higher position in the sorted typo suspect list. This will potentially decrease the FP rate in some cases, because the typo suspects that are pointed to by two separate TLs are more likely to result in real typos.

There is an alternative way to the straightforward implementation of trigram (word groups of three) and fourgram (word groups of four) control. Namely, the most common bi- and trigrams can be considered separate single words, and then the bigram collocations are considered wherein one of the two words may in fact be the previously defined bi- or trigram.

In some embodiments, a CSSC application may be run prior to performing an embodiment of the method in order to eliminate part of the real-word typos that are correctable by CSSC. In turn, this will leave fewer typos to correct, thus focusing the time spent by a human on correcting only those typos that cannot be corrected by computerized methods.

The present invention may be implemented in an application that may be operable using a variety of end user devices. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for detecting real-word typos, the method comprising:
   receiving text designated for evaluation, the designated text comprising a plurality of words;
   executing instructions stored in memory, wherein execution of the instructions by a processor:
   parses the plurality of words into a plurality of word groups, each word group comprising a number of consecutive words found in the designated text,
   identifies a database for comparison to the text, the database comprising
   a plurality of word groups previously identified in one or more source texts, each word group in the database comprising the number of consecutive words found in the one or more source texts, and
   analyzes the word groups parsed from the designated text based on a comparison to the word groups in the identified database; and
   generating an indication that a word group from the designated text may include an error based on the analysis of the word group in comparison to the identified database, wherein the analysis comprises generating a typo likelihood value for each word group parsed from the designated text, and
   wherein the typo likelihood value of a word group parsed from the designated text is based on a product of a number of times each word in the word group appears in the database, the product divided by a number of times the word group comprising the consecutive words appears in the database.

2. The method of claim 1, wherein the number of words in the word group is two and wherein the word group comprises two words that appear consecutively in the received text.

3. The method of claim 1, further comprising building the database by:
   receiving a designated source text, the source text comprising a plurality of words;
   parsing the plurality of words into a plurality of word groups, each word group comprising the number of consecutive words found in the source text; and
   storing the parsed plurality of word groups in a database in memory.

4. The method of claim 3, further comprising storing in the memory a number of times each word of each word group appears in the source text and a number of times the word group appears in the source text.

5. The method of claim 1, wherein the indication is provided to another party for correction.

6. The method of claim 1, wherein the indication includes a suggestion for correcting the error, the suggestion based on information regarding the word groups in the database.

7. A system for detecting real-word typos, the system comprising:
- a memory configured to store a database comprising a plurality of word groups, each word group comprising a number of consecutive words previously parsed from a source text;
- an interface configured to receive a text designated for evaluation, the designated text comprising a plurality of words;
- a processor configured to execute instructions stored in memory to:
- parse the plurality of words into a plurality of word groups, each word group comprising the number of consecutive words found in the designated text,
- identify a database for comparison to the designated text based on a language of the designated text;
- analyze the word groups parsed from the designated text based on a comparison to the word groups in the identified database; and
- a display generation engine configured to generate an indication that a word group from the designated text may include an error based on the analysis of the word group in comparison to the identified database, wherein the analysis comprises generating a typo likelihood value for each word group parsed from the designated text, and
- wherein the typo likelihood value of a word group parsed from the designated text is based on a product of a number of times each word in the word group appears in the database, the product divided by a number of times the word group comprising the consecutive words appears in the database.

8. The system of claim 7, wherein the processor is further configured to execute instructions to build a database by:
- receiving a designated source text, the source text comprising a plurality of words;
- parsing the plurality of words into a plurality of word pairs, each word pair comprising two consecutive words found in the source text; and
- storing the parsed plurality of word pairs in the database in memory.

9. The system of claim 7, wherein the database in memory is further configured to store a number of times each word of each word group appears in the source text and a number of times the word group appears in the source text.

10. A computer-readable storage medium, having embodied thereon a program, the program being executable by a processor to perform a method for detecting real-word typos, the method comprising:
- receiving text designated for evaluation, the designated text comprising a plurality of words;
- parsing the plurality of words into a plurality of word groups, each word group comprising a number of consecutive words found in the designated text,
- identifying a database for comparison to the text, the database comprising a plurality of word groups previously identified in one or more source texts, each word group in the database comprising the number of consecutive words found in the one or more source texts,
- analyzing the word groups parsed from the designated text based on a comparison to the word groups in the identified database; and
- generating an indication that a word group from the designated text may include an error based on the analysis of the word group in comparison to the identified database, wherein the analysis comprises generating a typo likelihood value for each word group parsed from the designated text, and
- wherein the typo likelihood value of a word group parsed from the designated text is based on a product of a number of times each word in the word group appears in the database, the product divided by a number of times the word group comprising the consecutive words appears in the database.

11. The computer-readable storage medium of claim 10, further comprising instructions for generating the database by:
- receiving a designated source text, the source text comprising a plurality of words;
- parsing the plurality of words into a plurality of word pairs, each word pair comprising two consecutive words found in the source text; and
- storing the parsed plurality of word pairs in a database.

12. The computer-readable storage medium of claim 11, further comprising storing in the memory a number of times a first word of each word pair appears in the source text, a number of times a second word of each word pair appears in the source text, and a number of times the word pair appears in the source text.

* * * * *